(No Model.)
F. J. HENDERSON.
FEED WATER PURIFIER.
No. 468,084. Patented Feb. 2, 1892.
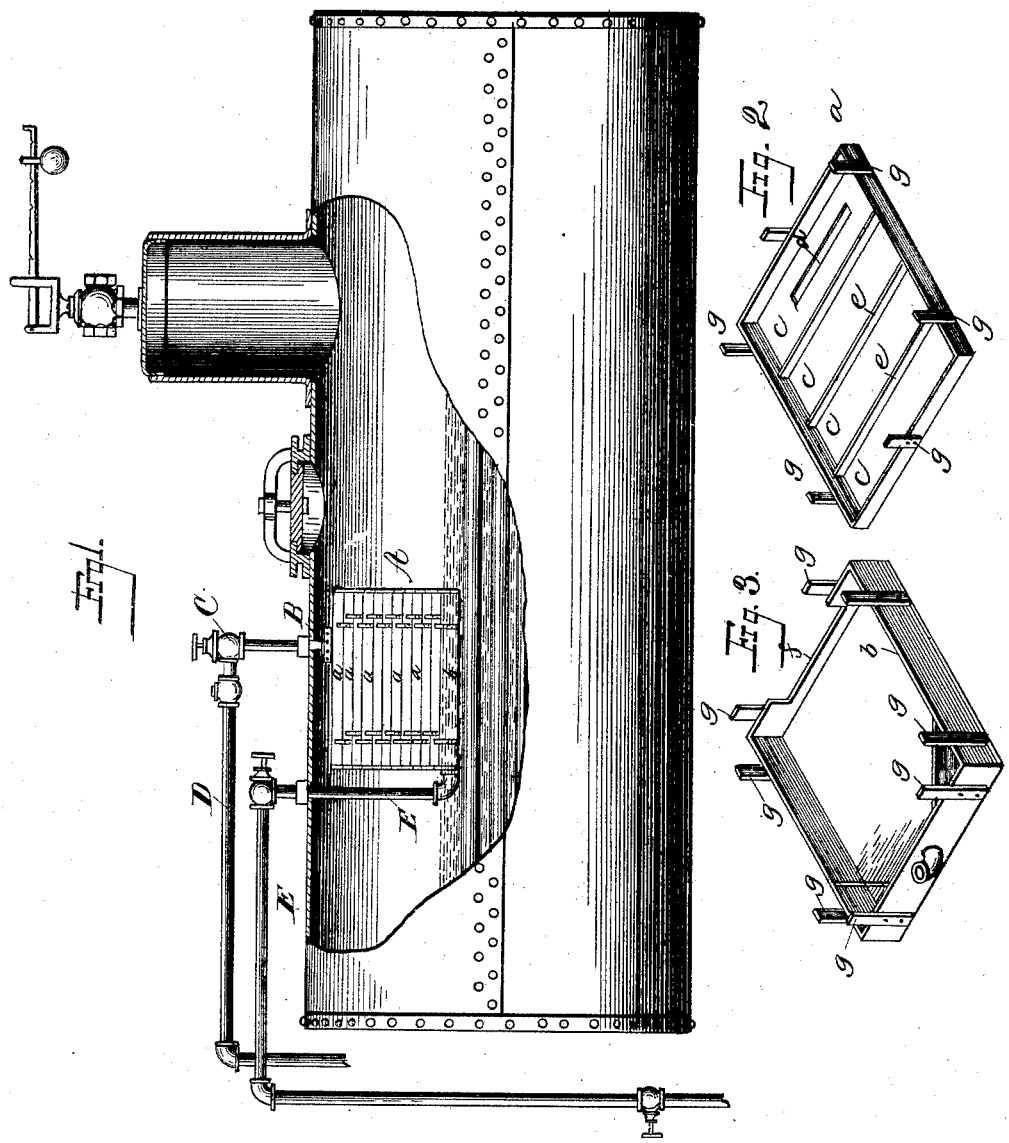
Witnesses:
J. M. Fowler Jr.
W. M. Sterling
Inventor
F. J. Henderson
By Ish Gunshart
Atty

UNITED STATES PATENT OFFICE.

FREDRICK J. HENDERSON, OF CHICAGO, ILLINOIS.

FEED-WATER PURIFIER.

SPECIFICATION forming part of Letters Patent No. 468,084, dated February 2, 1892.

Application filed February 26, 1891. Serial No. 382,952. (No model.)

*To all whom it may concern:*

Be it known that I, FREDRICK J. HENDERSON, a citizen of the United States, and a resident of Chicago, in the county of Cook and State of Illinois, have invented new and useful Improvements in Feed-Water Purifiers; and I do hereby declare the following to be a full, clear, and exact description of said invention, reference being had to the accompanying drawings, and to the letters of reference marked thereon, which form a part of this specification.

My invention relates to new and useful improvements in the method and apparatus for feeding water to steam-boilers, wherein the feed-water is purified before commingling with that contained in the boiler.

The object of the invention is to utilize a method of feeding water to a boiler in which the impurities and sediment contained in the water are more readily precipitated, and to provide a device through which the feed-water is carried and in the operation of passing through the device is relieved of any sediment or other impurities before it becomes a part of the heated body of water contained in the boiler, and, further, to provide means whereby the purifying device may be cleaned by blowing out the sediment by means of the steam-pressure.

The invention consists in the method of spraying or sprinkling the feed-water into the steam-space of the boiler, whereby it readily becomes heated, catching the feed-water thus sprayed and heated in a suitable receptacle within the steam-space of the boiler and causing it to flow in a channel provided with cross-ledges, and finally enter a submerged receptacle, wherein the heavier sediments are deposited.

The invention consists, further, in providing a series of pans arranged one above another and communicating one with the other through the bottoms of the respective pans at their alternate ends, the said pans above the water-line being provided with several compartments, into and over which the feed-water must flow in passing throughout the entire series to the bottom pan, which pan is not partitioned, as it is designed to be located below the water-line and form a receptacle for the heavy sediment which may escape the series of pans above.

The invention consists, further, in providing the bottom pan or mud-receptacle with a blow-off pipe, by which the entire device may be cleaned of the sediment deposited therein by the feed-water pipe above the uppermost separating-pan, and in providing the outlet of the feed-pipe with a spraying or sprinkling device, whereby the feed-water is more readily heated by the steam and the action of separating the impurities therefrom greatly facilitated.

The invention further consists in certain novel features in the arrangement and construction of parts, all as hereinafter described.

In the accompanying drawings, Figure 1 represents a side elevation of a steam-boiler, having a portion of the boiler-shell broken away to expose to view the location of the feed-water purifier and the pipes operating therewith. Fig. 2 is a perspective view of one of the separating pans or sections. Fig. 3 is a perspective view of the bottom or mud pan, showing the outlet for the feed-water and the L connection for the blow-off pipe.

The purifier A is located in the interior of the boiler, as shown in Fig. 1, on the hot-air tubes extending therethrough, the greater part of the device extending above the water-line into the steam-space of the boiler. The purifier comprises a series of pans or shallow receptacles of the form shown in Fig. 2, which are arranged one above the other and may be of any desired number, and a bottom pan or receptacle, of substantially the same form shown in Fig. 3, which supports the series of separating-pans and is located below the water-line to catch and retain the heavier sediments. The separating-pans *a* are provided with transverse partitions, which divide the several pans into a series of compartments *c*. Within one of the compartments *c* and in the bottom of the pan *a* is formed a slit or other suitable opening *d*, through which the feed-water, after filling the other compartments, will flow into the pan next below, which is situated in such manner as to have its slitted or open compartment reverse to that in the pan above, and thus the same relation is borne out between the remaining pans. By the above-described arrangement the feed-water enters the uppermost pan at one end and, after filling the first compartment, flows over the partition or ledge $e$ into the next compartment, and so on until it reaches the end compartment having the opening $d$ therein, from which it descends to the pan below provided with similar compartments and which are filled in the same order as in the one above and, after reaching the slitted compartment, descends in like manner to the pan or receptacle below, and thus throughout the entire series of pans until it reaches the mud-pan $b$, which discharges the water into the boiler through an opening $f$ in the side of the pan. After the several compartments have become filled the course of the water is obstructed by the partitions $e$ and allowed to deposit the lime, magnesia, and other alkaline impurities which are contained in solution in the water in the series of pans, which, by virtue of the cross-ledges, contain several pools of comparatively still water, which readily permits this precipitation, while at the same time these ledges present to the course of the water an extensive resistance-surface. This action is greatly facilitated by spraying the feed-water into the steam-space of the boiler, when it becomes heated before reaching the separating-pans, and thus, being increased in volume, more readily precipitates its impurities. The bottom pan $b$ is designed to retain the final sediment which may be contained in the water after passing through the series of separating-pans $a$, and for this purpose is made of larger size than the pans $a$, and will be submerged or partly submerged in the main body of water in the boiler. The object had in view in the construction of the bottom pan is to form a pool of comparatively still water in which the mud and other sediment will have a chance to settle. The pan $b$ is not provided with the cross-ledges $e$ or an opening in its bottom, but has a portion of its end cut down to form an opening $f$, through which the feed-water may flow. The pans are constructed in sections and provided with strips $g$, extending above the rim of each pan and forming the means of holding them securely together, one above the other.

The device B for spraying the feed-water may be of any suitable form of construction, being preferably a hollow disk provided with a series of small holes for the outlet of the water, and the flow of the water to the purifier is controlled, as usual, by a valve C in the feed-water pipe D.

Another and important feature of the invention is the facility with which the purifier can be cleaned of the sediment when the boiler is in operation without cooling it down by the removal of the cover of the man-hole. To the bottom or mud pan $b$ is attached a blow-off pipe E, controlled by suitable valves, which may be opened from time to time, when desired, and the mud and sediment deposited within the pans blown out by the force of the steam within the boiler.

In the operation of cleaning the various pans the outlet $f$ becomes the inlet for the steam, and the pressure of steam throughout the opening drives the water of the boiler back through and sweeps or washes the pans of the sediment, and forces it out of the mud-discharge or blow-off pipe, as indicated.

Having thus described my invention, what I claim, and desire to secure by Letters Patent, is—

A feed-water purifier located in the steam-space of the boiler, consisting of a series of receptacles or pans provided with cross-ledges standing across from side to side, forming thereby separate compartments adapted to retain comparatively still pools of water, the said pans arranged one above the other and communicating one with the other through an opening in the bottom of the respective pans at their alternate ends, and a bottom receptacle having an outlet into the boiler, substantially as described, and for the purpose set forth.

In testimony whereof I affix my signature in presence of two subscribing witnesses.

FREDRICK J. HENDERSON.

Witnesses:
OSCAR A. V. RUNNGREN,
PAUL MUEHL.